E. BEST.
NUT LOCK.
APPLICATION FILED JUNE 3, 1915.

1,163,064.

Patented Dec. 7, 1915.

Witnesses

Inventor
E. Best
By Chandler & Chandler
Attorneys

UNITED STATES PATENT OFFICE.

EBEN BEST, OF SAN ANTONIO, TEXAS.

NUT-LOCK.

1,163,064.   Specification of Letters Patent.   Patented Dec. 7, 1915.

Application filed June 3, 1915.   Serial No. 31,967.

*To all whom it may concern:*

Be it known that I, EBEN BEST, a citizen of the United States, residing at San Antonio, in the county of Bexar, State of Texas, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks.

The principal object of the invention is to provide a novel and efficient device for locking a nut on the end of an axle shaft or the like.

Other objects and advantages will be apparent from the following description when taken in connection with the accompanying drawing.

Figure 1:
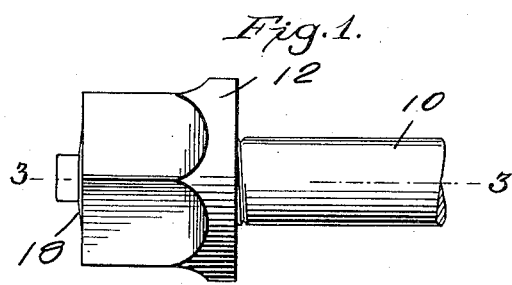
Figure 2:
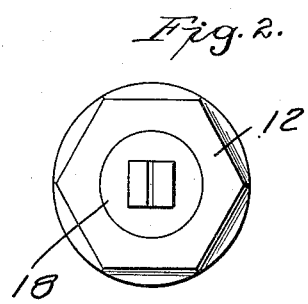
Figure 3:
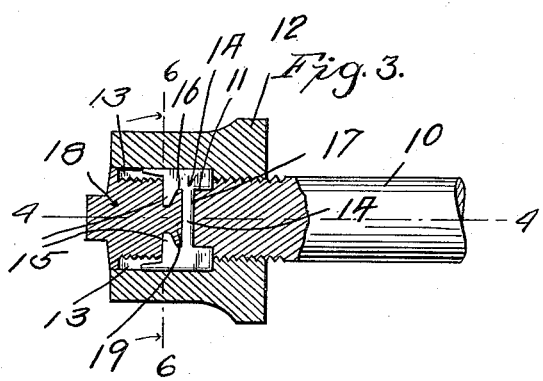
Figure 6:
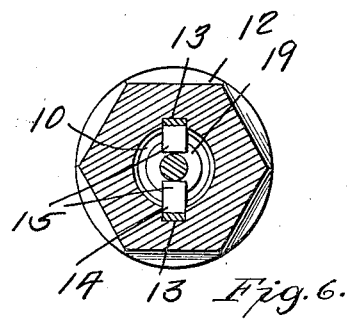
Figure 4:
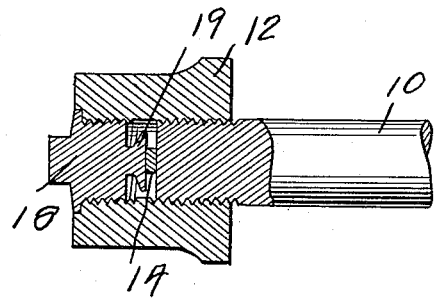
Figure 5:
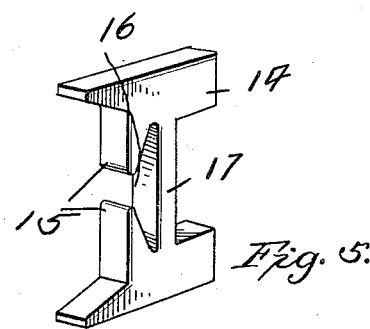

In the drawing: Figure 1 is an elevation of a bolt and nut equipped with my improved locking device, Fig. 2 is an end elevation, showing the screw having a slotted head, Fig. 3 is a longitudinal sectional view on the line 3—3 of Fig. 1, Fig. 4 is a longitudinal section on the line 4—4 of Fig. 3, Fig. 5 is a perspective view of the locking plate, and Fig. 6 is a transverse section on the line 6—6 of Fig. 3.

Referring particularly to the accompanying drawing, 10 represents a bolt in the outer end of the threaded portion of which there are formed the two diametrically opposite notches 11, these notches opening through the sides of the bolt, as well as through the end. A nut 12 is screwed on to the bolt and has in the outer portion of the bore and in diametrically opposite sides the longitudinally extending grooves 13 which are adapted to register with the notches 11 of the end of the bolt. Passed into the grooves 13 is an H-shaped plate 14, the inner ends of the legs of which engage in the notches 11 of the bolt while the sides of the legs engage in the grooves 13 and thus act as keys to prevent either the nut or bolt rotating with respect to each other. On the inner faces of the outer portions of the legs are the inwardly directed projections 15 forming a recess 16 between said projections and the cross bar 17 of the H-shaped plate. Screwed into the lower end of the nut is a threaded plug 18 the inner end of which is formed with an outwardly flaring knob 19 which engages in the recess 16 while the projections 15 engage the neck of said knob. Thus when the plug 18 is rotated the knob 19 will rotate freely within the recess 16 and as the plug advances into the nut the H-shaped plate will be driven toward the bolt so as to engage in the notches 11 thereof. When the plug 18 is unscrewed, the plate 14 follows it out through the grooves 13. As seen in Fig. 2, the screw 18 is provided with a slotted head for use in connection with a screw driver.

What is claimed is:

In a nut lock, the combination with a bolt having diametrically arranged notches in its outer end, of a nut engaged on the bolt and having diametrically opposite longitudinal grooves in the wall of the threaded bore thereof, an H-shaped member disposed slidably in the grooves and engaging in the notches of the bolt and having a recess in its outer end and a screw plug engaged in the outer end of the nut and formed with a knob on the inner end rotatably engaged in the said recess of the H-shaped member.

In testimony whereof, I affix my signature, in the presence of two witnesses.

EBEN BEST.

Witnesses:
SOLOMON TRIVITT,
OSCAR H. NANCE.

Copies of this patent may be obtained for five cents each, by addressing the "Commissioner of Patents, Washington, D. C."